(12) United States Patent
Li

(10) Patent No.: US 11,209,680 B2
(45) Date of Patent: Dec. 28, 2021

(54) LIQUID CRYSTAL PANEL AND METHOD FOR MANUFACTURING SAME

(71) Applicant: WUHAN CHINA STAR OPTOELECTRONICS TECHNOLOGY CO., LTD., Wuhan (CN)

(72) Inventor: Bangrong Li, Wuhan (CN)

(73) Assignee: WUHAN CHINA STAR OPTOELECTRONICS TECHNOLOGY CO., LTD., Wuhan (CN)

(*) Notice: Subject to any disclaimer, the term of this patent is extended or adjusted under 35 U.S.C. 154(b) by 476 days.

(21) Appl. No.: 16/462,124

(22) PCT Filed: Nov. 22, 2018

(86) PCT No.: PCT/CN2018/117048
§ 371 (c)(1),
(2) Date: May 17, 2019

(87) PCT Pub. No.: WO2020/082483
PCT Pub. Date: Apr. 30, 2020

(65) Prior Publication Data
US 2021/0356777 A1    Nov. 18, 2021

(30) Foreign Application Priority Data
Oct. 23, 2018  (CN) .......................... 201811240136.4

(51) Int. Cl.
G02F 1/13      (2006.01)
G02F 1/1335    (2006.01)
G02F 1/13363   (2006.01)
G01K 11/165    (2021.01)

(52) U.S. Cl.
CPC ............ G02F 1/132 (2013.01); G01K 11/165 (2013.01); G02F 1/133514 (2013.01); G02F 1/133528 (2013.01); G02F 1/133553 (2013.01); G02F 1/133638 (2021.01); G02F 2413/01 (2013.01); G02F 2413/05 (2013.01)

(58) Field of Classification Search
CPC ..................................................... G02F 1/132
See application file for complete search history.

(56) References Cited

U.S. PATENT DOCUMENTS

2018/0246362 A1* 8/2018 Ohshima ................. G03F 9/708
* cited by examiner

*Primary Examiner* — Edmond C Lau
(74) *Attorney, Agent, or Firm* — Osha Bergman Watanabe & Burton LLP

(57) ABSTRACT

A liquid crystal panel and a method for manufacturing the liquid crystal panel is provided. The liquid crystal panel includes an upper substrate and a lower substrate disposed opposite to each other, a plurality of color resistances disposed on a side of the upper substrate facing the lower substrate, and a frame adhesive and a liquid crystal layer disposed between the upper substrate and the lower substrate; a plurality of display regions are enclosed between the upper substrate and the lower substrate by the frame adhesive; each display region includes one color resistance, each color resistance includes one numerical hollow pattern, and the numerical hollow pattern of each color resistance is not same as others; the liquid crystal layer includes a plurality of liquid crystals disposed in the display regions; a clearing point temperature of the liquid crystal of each different display region is not same as others.

10 Claims, 2 Drawing Sheets

LIQUID CRYSTAL PANEL AND METHOD FOR MANUFACTURING SAME

CROSS REFERENCE TO RELATED APPLICATION

This application claims the priority of International Application No. PCT/CN2018/117048, filed on 2018 Nov. 22, which claims priority to Chinese Application No. 201811240136.4, filed on 2018 Oct. 23. The entire disclosures of each of the above applications are incorporated herein by reference.

BACKGROUND OF INVENTION

Field of Invention

The present application relates to a display technology field, and particularly to a liquid crystal panel and a method for manufacturing a liquid crystal panel.

Description of Prior Art

Thin film transistors (TFTs) are a main driving component in current liquid crystal displays (LCDs) and active matrix organic light-emitting diodes (AMOLEDs), and directly related to a display performance of a flat panel display device.

Most liquid crystal displays on the market are backlight type liquid crystal displays, which include a liquid crystal display panel and a backlight module. The working principle of the liquid crystal display panel is liquid crystal molecules filled between a thin film transistor array substrate (TFT array substrate) and a color filter (CF) substrate, a pixel voltage and a common voltage is applied on the two substrates, rotation directions of the liquid crystal molecules are controlled by an electric field generated by the pixel voltage and the common voltage to transmit the light of the backlight module to generate a picture. An upper and a lower polarizer are formed on both sides of the two substrates of the liquid crystal display panel, when the light passes through the lower polarizer to becoming polarized light, because the optical rotation of the liquid crystal molecules, the angle of the light is adjusted by the voltage, so that angles and brightness of the light passing through the upper polarizer are controlled.

In today's daily life, live is more convenient, and more and more places need to display temperature. For example, in daily life, control and use of domestic water is an important part, especially the water temperature control of the family, people need to know whether the water flowing from the water heater or the faucet is hot or cold to avoid too hot or too cold, so a temperature display component is usually installed on the water heater or the faucet, but the current temperature display component includes at least three part structures: a temperature sensor, a processor, and a display, so the current temperature display component includes more structures, is troublesome to manufacture, needs an additional power supply, and consumes a lot of power, which do not meet the current concept of environmental protection and energy conservation. How to provide a temperature display component with a simpler structure and no power consumption to realize water temperature display and further improve the quality of life is a problem that must be solved in modern daily life.

SUMMARY OF INVENTION

The application mainly provides a liquid crystal panel, a clearing point temperature of the liquid crystal of each different display region is not same as others to display a numerical hollow pattern of the color resistances corresponding to liquid crystals with a clearing point temperature being greater than an environment temperature to display the environment temperature.

The application mainly also provides a method for manufacturing a liquid crystal panel, a clearing point temperature of the liquid crystal of each different display region is not same as others to display a numerical hollow pattern of the color resistances corresponding to liquid crystals with a clearing point temperature being greater than an environment temperature to display the environment temperature.

For the above-mentioned objective, the present disclosure provides a liquid crystal panel including: an upper substrate and a lower substrate disposed opposite to each other, a plurality of color resistances disposed on a side of the upper substrate facing the lower substrate, a frame adhesive and a liquid crystal layer disposed between the upper substrate and the lower substrate;

wherein a plurality of display regions are enclosed between the upper substrate and the lower substrate by the frame adhesive;

each display region includes one color resistance, each color resistance includes one numerical hollow pattern, and the numerical hollow pattern of each color resistance is not same as others; and the liquid crystal layer includes a plurality of liquid crystals disposed in the display regions; a clearing point temperature of the liquid crystal of each different display region is not same as others.

The liquid crystal panel further includes a polarizer disposed on a side of the upper substrate away from the lower substrate, a quarter wave plate disposed between the upper substrate and the polarizer, and a reflecting layer disposed on a side of the lower substrate facing the upper substrate.

The liquid crystal panel further includes a protecting layer formed on the upper substrate covering the plurality of color resistances, a first alignment film formed on the protecting layer, and a second alignment film formed on the reflecting layer.

When a clearing point temperature of the liquid crystal of one display region is less than or equal to an environment temperature, the liquid crystal loses an optical rotation to light, and the numerical hollow pattern of the color resistance of the display region is not displayed; when a clearing point temperature of the liquid crystal of one display region is great than or equal to the environment temperature, the liquid crystal shows an optical rotation to light, and the numerical hollow pattern of the color resistance of the display region is displayed normally.

The color resistances are arranged horizontally or vertically; a number corresponding to the numerical hollow pattern of the color resistances which is close to a short edge of the upper substrate is N, wherein N is defined as a positive integer, the clearing point temperature of the liquid crystal placed in one display region same as where one color resistance corresponding to the number N placed is N+1° C.

A difference value of the numbers corresponding to the numerical hollow patterns of the two adjacent color resistances is 5-10.

The present disclosure also provides method for manufacturing a liquid crystal panel, including:

Step S1, providing an upper substrate, forming a plurality of color resistances spacing from each other on the upper substrate, and forming a plurality of numerical hollow patterns on the color resistances by an etching process, wherein the numerical hollow pattern of each color resistance is not same as others;

Step S2, forming a frame adhesive on the upper substrate, enclosing a plurality of display regions by the frame adhesive, wherein each display region includes one color resistance; forming a protecting layer on the color resistances and forming a first alignment film on the protecting layer;

Step S3, providing a lower substrate, forming a reflecting layer on the lower substrate, and forming a second alignment film on the reflecting layer;

Step S4, aligning the first alignment film and the second alignment film, and dropping liquid crystals with different clearing point temperatures into the display regions to form a liquid crystal layer;

Step S5, coupling a side surface of the upper substrate with the color resistances to a side surface of the lower substrate with the reflecting layer; and Step S6, disposing a quarter wave plate and a polarizer successively on a side of the upper substrate away from the lower substrate.

When a clearing point temperature of the liquid crystal of one display region is less than or equal to an environment temperature, the liquid crystal loses an optical rotation to light, and the numerical hollow pattern of the color resistance of the display region is not displayed; when a clearing point temperature of the liquid crystal of one display region is great than or equal to the environment temperature, the liquid crystal shows an optical rotation to light, and the numerical hollow pattern of the color resistance of the display region is displayed normally.

The color resistances are arranged horizontally or vertically; a number corresponding to the numerical hollow pattern of the color resistances which is close to a short edge of the upper substrate is N, wherein N is defined as a positive integer, the clearing point temperature of the liquid crystal placed in one display region same as where one color resistance corresponding to the number N placed is N+1° C.

A difference value of the numbers corresponding to the numerical hollow patterns of the two adjacent color resistances is 5-10.

The beneficial effect of this invention is: the liquid crystal panel of the present disclosure includes an upper substrate and a lower substrate disposed opposite to each other, a plurality of color resistances disposed on a side of the upper substrate facing the lower substrate, and a frame adhesive and a liquid crystal layer disposed between the upper substrate and the lower substrate; a plurality of display regions are enclosed between the upper substrate and the lower substrate by the frame adhesive; each display region includes one color resistance, each color resistance includes one numerical hollow pattern, and the numerical hollow pattern of each color resistance is not same as others; the liquid crystal layer includes a plurality of liquid crystals disposed in the display regions; a clearing point temperature of the liquid crystal of each different display region is not same as others, when a clearing point temperature of the liquid crystal of one display region is less than or equal to an environment temperature, the liquid crystal loses an optical rotation to light, the display region cannot emit light, and the numerical hollow pattern of the color resistance of the display region is not displayed; when a clearing point temperature of the liquid crystal of one display region is great than or equal to the environment temperature, the liquid crystal shows an optical rotation to light, the display region can emit light, and the numerical hollow pattern of the color resistance of the display region is displayed normally; so, the liquid crystal panel of the present disclosure can display a numerical hollow pattern of the color resistances corresponding to liquid crystals with a clearing point temperature being greater than an environment temperature to display the environment temperature, comparing to prior art temperature display components, the liquid crystal panel of the present disclosure does not need a temperature sensor and a processor and can display the environment temperature, a simpler structure and no power consumption. The method for manufacturing the liquid crystal panel has a simpler producing process, and the liquid crystal panel manufactured by the method not need a temperature sensor and a processor and can display the environment temperature.

BRIEF DESCRIPTION OF DRAWINGS

In order to further understand the features and technical contents of the present invention, please refer to the following detailed description and drawings regarding the present invention, however, the drawings are provided for reference and description only and are not intended to limit the invention.

Figure 1:
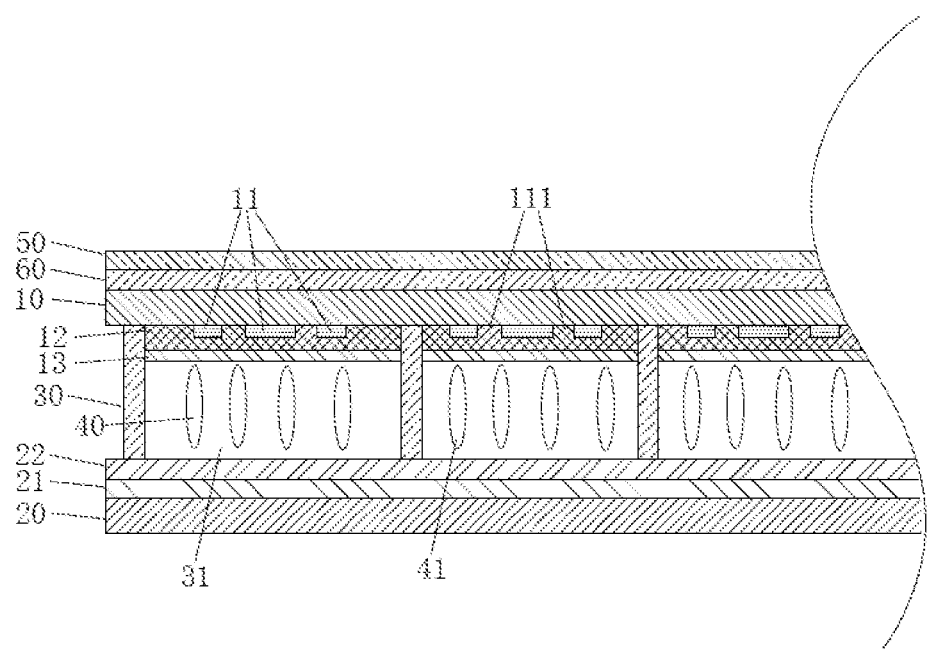

In FIGs,

FIG. 1 is a structural view of a liquid crystal panel of the present disclosure.

Figure 2:
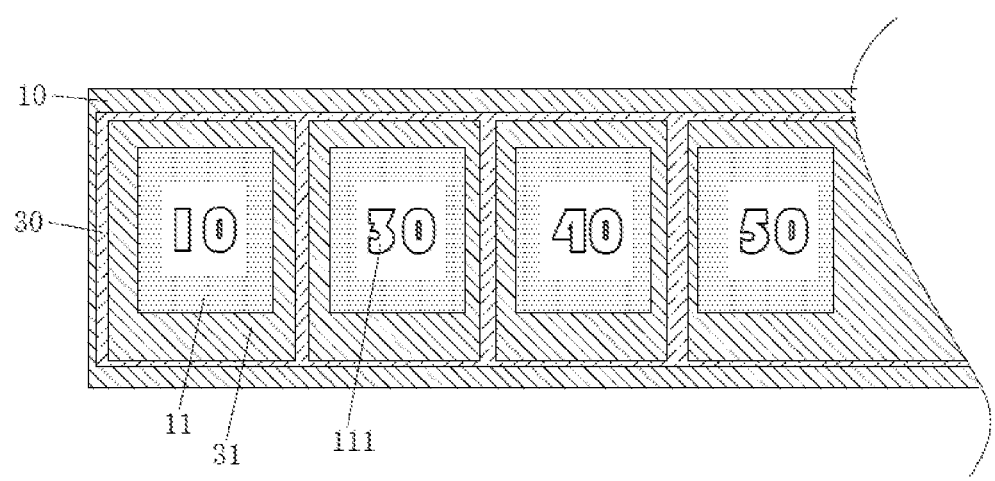

FIG. 2 is a top view of an upper substrate of a liquid crystal panel of the present disclosure.

Figure 3:
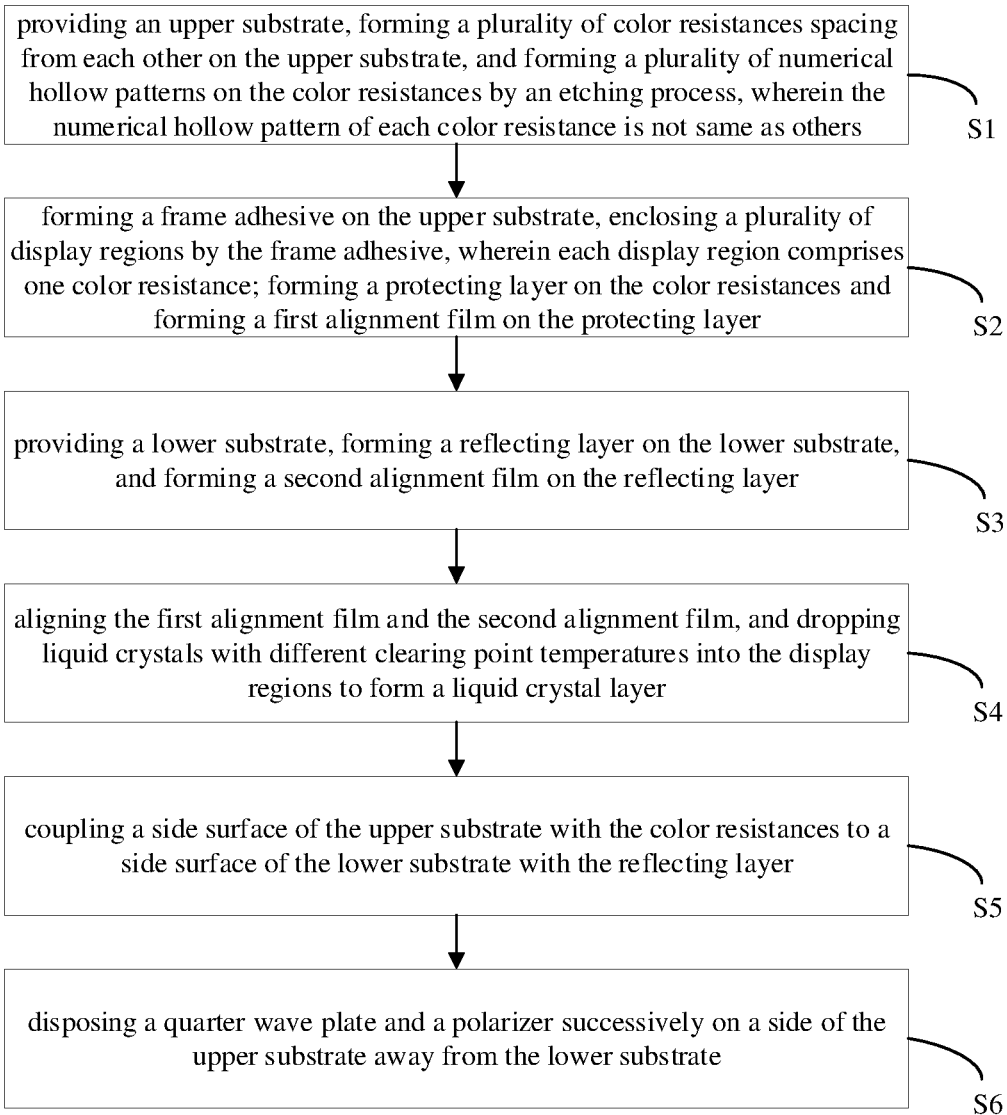

FIG. 3 is a flow chart of a method for manufacturing the liquid crystal panel.

DETAILED DESCRIPTION OF PREFERRED EMBODIMENTS

In order to further clarify the technical means and effects of the present invention, the following detailed description will be made in conjunction with the preferred embodiments of the invention and the accompanying drawings.

Referring to FIG. 1, the present disclosure provides a liquid crystal panel including an upper substrate 10 and a lower substrate 20 disposed opposite to each other, a plurality of color resistances 11 disposed on a side of the upper substrate 10 facing the lower substrate 20, and a frame adhesive 30 and a liquid crystal layer 40 disposed between the upper substrate 10 and the lower substrate 20;

A plurality of display regions 31 are enclosed between the upper substrate 10 and the lower substrate 20 by the frame adhesive 30;

Each display region 31 includes one color resistance 11, each color resistance 11 includes one numerical hollow pattern 111, and the numerical hollow pattern 111 of each color resistance 11 is not same as others;

The liquid crystal layer 40 includes a plurality of liquid crystals 41 disposed in the display regions; a clearing point temperature of the liquid crystal 41 of each different display region 31 is not same as others.

In detail, the liquid crystal panel further includes a polarizer 50 disposed on a side of the upper substrate 10 away from the lower substrate 20, a quarter wave plate 60 disposed between the upper substrate 10 and the polarizer 50, and a reflecting layer 21 disposed on a side of the lower substrate 20 facing the upper substrate 10.

In detail, the liquid crystal panel further includes a protecting layer 12 formed on the upper substrate 10 covering the plurality of color resistances 11, a first alignment film 13 formed on the protecting layer 12, and a second alignment film 32 formed on the reflecting layer 21.

It should be noted, when the liquid crystal panel of present disclosure is working, light pass through the polarizer 50 and the quarter wave plate 60 to enter into the liquid crystal layer 40 and reach the reflecting layer 21, the light is reflected by the reflecting layer 21 back to the liquid crystal layer 40, the liquid crystals 41 of the liquid crystal layer 40 has an optical rotation to light to change a polarization direction of the light and to make the light pass through the quarter wave plate 60 and the polarizer 50 to exit; because a clearing point temperature of the liquid crystal 41 of each different display region 31 is not same as others, when a clearing point temperature of the liquid crystal 41 of one display region 31 is less than or equal to an environment temperature, the liquid crystal 41 loses an optical rotation to light, the display region 31 cannot emit light, and the numerical hollow pattern 111 of the color resistance 11 of the display region 31 is not displayed; when a clearing point temperature of the liquid crystal 41 of one display region 31 is great than or equal to the environment temperature, the liquid crystal 41 shows an optical rotation to light, the display region 31 can emit light, and the numerical hollow pattern 111 of the color resistance 11 of the display region 31 is displayed normally; so, the liquid crystal panel of the present disclosure can display a numerical hollow pattern 111 of the color resistances 11 corresponding to liquid crystals 41 with a clearing point temperature being greater than an environment temperature to display the environment temperature, comparing to prior art temperature display components, the liquid crystal panel of the present disclosure does not need a temperature sensor and a processor and can display the environment temperature with a simpler structure and no power consumption.

In detail, the color resistances 11 are arranged horizontally or vertically; a number corresponding to the numerical hollow pattern 111 of the color resistances 11 which is close to a short edge of the upper substrate 10 is N, wherein N is defined as a positive integer, the clearing point temperature of the liquid crystal 41 placed in one display region 31 same as where one color resistance 11 corresponding to the number N placed is N+1° C.

In detail, a difference value of the numbers corresponding to the numerical hollow patterns 111 of the two adjacent color resistances 11 is 5-10.

In detail, numbers corresponding to the numerical hollow pattern 111 of the color resistances 11 increases in turn.

For example, referring to FIG. 2, the numbers corresponding to the numerical hollow patterns 111 of the color resistances 11 are 10, 20, 30, 40, . . . , 90, 100 from left to right, clearing point temperatures of the liquid crystals 41 of the display regions 31 corresponding to the color resistances 11 are 11° C., 21° C., 31° C., 41° C., . . . , 91° C., 101° C. from left to right, when the environment temperature is 40° C., the liquid crystals 41 with the clearing point temperatures being 11° C., 21° C., and 31° C. lose optical rotations to light, the color resistances 11 corresponding to the numbers being 10, 20, and 30 of the numerical hollow patterns 111 are not displayed, the liquid crystals 41 with the clearing point temperatures being from 41° C. to 101° C. show optical rotations to light, so the liquid crystal panel displays the numbers from 40 to 100, the smallest number shown by the liquid crystal panel is the environment temperature.

In detail, the liquid crystal panel can be used in the water heater or the faucet, the liquid crystal panel directly contacts the water of the water heater or the faucet to directly display the temperature of the water of water pipes.

In detail, the liquid crystal panel is a reflective twisted nematic (RTN) type liquid crystal panel.

In detail, material of the reflective layer 21 is preferably aluminum.

Referring to FIG. 3, according to the above liquid crystal panel, the present disclosure also provides a method for manufacturing a liquid crystal panel including the following steps:

Step S1, providing an upper substrate 10, forming a plurality of color resistances 11 spacing from each other on the upper substrate 10, and forming a plurality of numerical hollow patterns 111 on the color resistances 11 by an etching process, wherein the numerical hollow pattern 111 of each color resistance 11 is not same as others;

Step S2, forming a frame adhesive 30 on the upper substrate 10, enclosing a plurality of display regions 31 by the frame adhesive 30, wherein each display region 31 includes one color resistance 11; forming a protecting layer 12 on the color resistances 11 and forming a first alignment film 13 on the protecting layer 12;

Step S3, providing a lower substrate 20, forming a reflecting layer 21 on the lower substrate 20, and forming a second alignment film 32 on the reflecting layer 21;

Step S4, aligning the first alignment film 13 and the second alignment film 32, and dropping liquid crystals 41 with different clearing point temperatures into the display regions 31 to form a liquid crystal layer 40;

Step S5, coupling a side surface of the upper substrate 10 with the color resistances 11 to a side surface of the lower substrate 20 with the reflecting layer 21; and Step S6, disposing a quarter wave plate 60 and a polarizer 50 successively on a side of the upper substrate 10 away from the lower substrate 20.

It should be noted, when the liquid crystal panel of present disclosure is working, light pass through the polarizer 50 and the quarter wave plate 60 to enter into the liquid crystal layer 40 and reach the reflecting layer 21, the light are reflected by the reflecting layer 21 back to the liquid crystal layer 40, the liquid crystals 41 of the liquid crystal layer 40 has an optical rotation to light to change a polarization direction of the light and to make the light pass through the quarter wave plate 60 and the polarizer 50 to exit; because a clearing point temperature of the liquid crystal 41 of each different display region 31 is not same as others, when a clearing point temperature of the liquid crystal 41 of one display region 31 is less than or equal to an environment temperature, the liquid crystal 41 loses an optical rotation to light, the display region 31 cannot emit light, and the numerical hollow pattern 111 of the color resistance 11 of the display region 31 is not displayed; when a clearing point temperature of the liquid crystal 41 of one display region 31 is great than or equal to the environment temperature, the liquid crystal 41 shows an optical rotation to light, the display region 31 can emit light, and the numerical hollow pattern 111 of the color resistance 11 of the display region 31 is displayed normally; so, the liquid crystal panel of the present disclosure can display a numerical hollow pattern 111 of the color resistances 11 corresponding to liquid crystals 41 with a clearing point temperature being greater than an environment temperature to display the environment temperature, comparing to prior art temperature display components, the liquid crystal panel of the present disclosure does not need a temperature sensor and a processor and can display the environment temperature with a simpler producing process, a simpler structure and no power consumption.

In detail, the color resistances 11 are arranged horizontally or vertically; a number corresponding to the numerical hollow pattern 111 of the color resistances 11 which is close to a short edge of the upper substrate 10 is N, wherein N is defined as a positive integer, the clearing point temperature of the liquid crystal 41 placed in one display region 31 same as where one color resistance 11 corresponding to the number N placed is N+1° C.

In detail, a difference value of the numbers corresponding to the numerical hollow patterns 111 of the two adjacent color resistances 11 is 5-10.

In detail, numbers corresponding to the numerical hollow pattern 111 of the color resistances 11 increases in turn.

For example, referring to FIG. 2, the numbers corresponding to the numerical hollow patterns 111 of the color resistances 11 are 10, 20, 30, 40, . . . , 90, 100 from left to right, clearing point temperatures of the liquid crystals 41 of the display regions 31 corresponding to the color resistances 11 are 11° C., 21° C., 31° C., 41° C., . . . , 91° C., 101° C. from left to right, when the environment temperature is 40° C., the liquid crystals 41 with the clearing point temperatures being 11° C., 21° C., and 31° C. lose optical rotations to light, the color resistances 11 corresponding to the numbers being 10, 20, and 30 of the numerical hollow patterns 111 are not displayed, the liquid crystals 41 with the clearing point temperatures being from 41° C. to 101° C. show optical rotations to light, so the liquid crystal panel displays the numbers from 40 to 100, the smallest number shown by the liquid crystal panel is the environment temperature.

In detail, the liquid crystal panel can be used in the water heater or the faucet, the liquid crystal panel directly contacts the water of the water heater or the faucet to directly display the temperature of the water of water pipes.

In detail, the liquid crystal panel is a reflective twisted nematic (RTN) type liquid crystal panel.

In detail, material of the reflective layer 21 is preferably aluminum.

The liquid crystal panel of the present disclosure includes an upper substrate and a lower substrate disposed opposite to each other, a plurality of color resistances disposed on a side of the upper substrate facing the lower substrate, and a frame adhesive and a liquid crystal layer disposed between the upper substrate and the lower substrate; a plurality of display regions are enclosed between the upper substrate and the lower substrate by the frame adhesive; each display region includes one color resistance, each color resistance includes one numerical hollow pattern, and the numerical hollow pattern of each color resistance is not same as others; the liquid crystal layer includes a plurality of liquid crystals disposed in the display regions; a clearing point temperature of the liquid crystal of each different display region is not same as others, when a clearing point temperature of the liquid crystal of one display region is less than or equal to an environment temperature, the liquid crystal loses an optical rotation to light, the display region cannot emit light, and the numerical hollow pattern of the color resistance of the display region is not displayed; when a clearing point temperature of the liquid crystal of one display region is great than or equal to the environment temperature, the liquid crystal shows an optical rotation to light, the display region can emit light, and the numerical hollow pattern of the color resistance of the display region is displayed normally; so, the liquid crystal panel of the present disclosure can display a numerical hollow pattern of the color resistances corresponding to liquid crystals with a clearing point temperature being greater than an environment temperature to display the environment temperature, comparing to prior art temperature display components, the liquid crystal panel of the present disclosure does not need a temperature sensor and a processor and can display the environment temperature, a simpler structure and no power consumption. The method for manufacturing the liquid crystal panel has a simpler producing process, and the liquid crystal panel manufactured by the method not need a temperature sensor and a processor and can display the environment temperature.

In the above, various other changes and modifications can be made in accordance with the technical solutions and technical concept of the present invention, and all such changes and modifications are within the scope of the claims of the present invention.

What is claimed is:

1. A liquid crystal panel, comprising: an upper substrate and a lower substrate disposed opposite to each other, a plurality of color resistances disposed on a side of the upper substrate facing the lower substrate, and a frame adhesive and a liquid crystal layer disposed between the upper substrate and the lower substrate;
    wherein a plurality of display regions are enclosed between the upper substrate and the lower substrate by the frame adhesive;
    each display region comprises one color resistance, each color resistance comprises one numerical hollow pattern, and the numerical hollow pattern of each color resistance is not same as others; and
    the liquid crystal layer comprises a plurality of liquid crystals disposed in the display regions; a clearing point temperature of the liquid crystal of each different display region is not same as others.

2. The liquid crystal panel of claim 1, further comprising a polarizer disposed on a side of the upper substrate away from the lower substrate, a quarter wave plate disposed between the upper substrate and the polarizer, and a reflecting layer disposed on a side of the lower substrate facing the upper substrate.

3. The liquid crystal panel of claim 2, further comprising a protecting layer formed on the upper substrate covering the plurality of color resistances, a first alignment film formed on the protecting layer, and a second alignment film formed on the reflecting layer.

4. The liquid crystal panel of claim 1, wherein when a clearing point temperature of the liquid crystal of one display region is less than or equal to an environment temperature, the liquid crystal loses an optical rotation to light, and the numerical hollow pattern of the color resistance of the display region is not displayed; when a clearing point temperature of the liquid crystal of one display region is great than or equal to the environment temperature, the liquid crystal shows an optical rotation to light, and the numerical hollow pattern of the color resistance of the display region is displayed normally.

5. The liquid crystal panel of claim 1, wherein the color resistances are arranged horizontally or vertically; a number corresponding to the numerical hollow pattern of the color resistances which is close to a short edge of the upper substrate is N, wherein N is defined as a positive integer, the clearing point temperature of the liquid crystal placed in one display region same as where one color resistance corresponding to the number N placed is N+1° C.

6. The liquid crystal panel of claim 5, wherein a difference value of the numbers corresponding to the numerical hollow patterns of the two adjacent color resistances is 5-10.

7. A method for manufacturing a liquid crystal panel, comprising:
    Step S1, providing an upper substrate, forming a plurality of color resistances spacing from each other on the upper substrate, and forming a plurality of numerical hollow patterns on the color resistances by an etching process, wherein the numerical hollow pattern of each color resistance is not same as others;

Step S2, forming a frame adhesive on the upper substrate, enclosing a plurality of display regions by the frame adhesive, wherein each display region comprises one color resistance; forming a protecting layer on the color resistances and forming a first alignment film on the protecting layer;

Step S3, providing a lower substrate, forming a reflecting layer on the lower substrate, and forming a second alignment film on the reflecting layer;

Step S4, aligning the first alignment film and the second alignment film, and dropping liquid crystals with different clearing point temperatures into the display regions to form a liquid crystal layer;

Step S5, coupling a side surface of the upper substrate with the color resistances to a side surface of the lower substrate with the reflecting layer; and Step S6, disposing a quarter wave plate and a polarizer successively on a side of the upper substrate away from the lower substrate.

8. The method for manufacturing the liquid crystal panel of claim 7, wherein when a clearing point temperature of the liquid crystal of one display region is less than or equal to an environment temperature, the liquid crystal loses an optical rotation to light, and the numerical hollow pattern of the color resistance of the display region is not displayed; when a clearing point temperature of the liquid crystal of one display region is great than or equal to the environment temperature, the liquid crystal shows an optical rotation to light, and the numerical hollow pattern of the color resistance of the display region is displayed normally.

9. The method for manufacturing the liquid crystal panel of claim 7, wherein the color resistances are arranged horizontally or vertically; a number corresponding to the numerical hollow pattern of the color resistances which is close to a short edge of the upper substrate is N, wherein N is defined as a positive integer, the clearing point temperature of the liquid crystal placed in one display region same as where one color resistance corresponding to the number N placed is N+1° C.

10. The method for manufacturing the liquid crystal panel of claim 9, wherein a difference value of the numbers corresponding to the numerical hollow patterns of the two adjacent color resistances is 5-10.

* * * * *